No. 852,557. PATENTED MAY 7, 1907.
N. T. HARRINGTON.
STARTING DEVICE FOR EXPLOSION ENGINES.
APPLICATION FILED MAR. 21, 1904.

3 SHEETS—SHEET 1.

WITNESSES
INVENTOR
NORMAN T. HARRINGTON
BY
ATT'Y.

No. 852,557. PATENTED MAY 7, 1907.
N. T. HARRINGTON.
STARTING DEVICE FOR EXPLOSION ENGINES.
APPLICATION FILED MAR. 21, 1904.

3 SHEETS—SHEET 2.

WITNESSES
James P. Barry.
Edward D. Ault

INVENTOR
NORMAN T. HARRINGTON
BY James Whittemore
ATT'Y.

No. 852,557. PATENTED MAY 7, 1907.
N. T. HARRINGTON.
STARTING DEVICE FOR EXPLOSION ENGINES.
APPLICATION FILED MAR. 21, 1904.

3 SHEETS—SHEET 3.

WITNESSES
James P. Barry
Amelia Williams

INVENTOR
NORMAN T. HARRINGTON.
BY James Whitmore
ATT'Y.

UNITED STATES PATENT OFFICE.

NORMAN T. HARRINGTON, OF DETROIT, MICHIGAN, ASSIGNOR TO OLDS MOTOR WORKS, OF DETROIT, MICHIGAN, A CORPORATION OF MICHIGAN.

STARTING DEVICE FOR EXPLOSION-ENGINES.

No. 852,557.  Specification of Letters Patent.  Patented May 7, 1907.

Application filed March 21, 1904. Serial No. 199,246.

*To all whom it may concern:*

Be it known that I, NORMAN T. HARRINGTON, residing at Detroit, in the county of Wayne and State of Michigan, a citizen of the United States, have invented certain new and useful Improvements in Starting Devices for Explosion-Engines, of which the following is a specification, reference being had therein to the accompanying drawings.

The invention relates to motor vehicles and has reference to certain features of construction of the starting mechanism and associated controlling devices, and consists in the peculiar construction, arrangement and combination of parts as hereinafter set forth.

Figure 1:
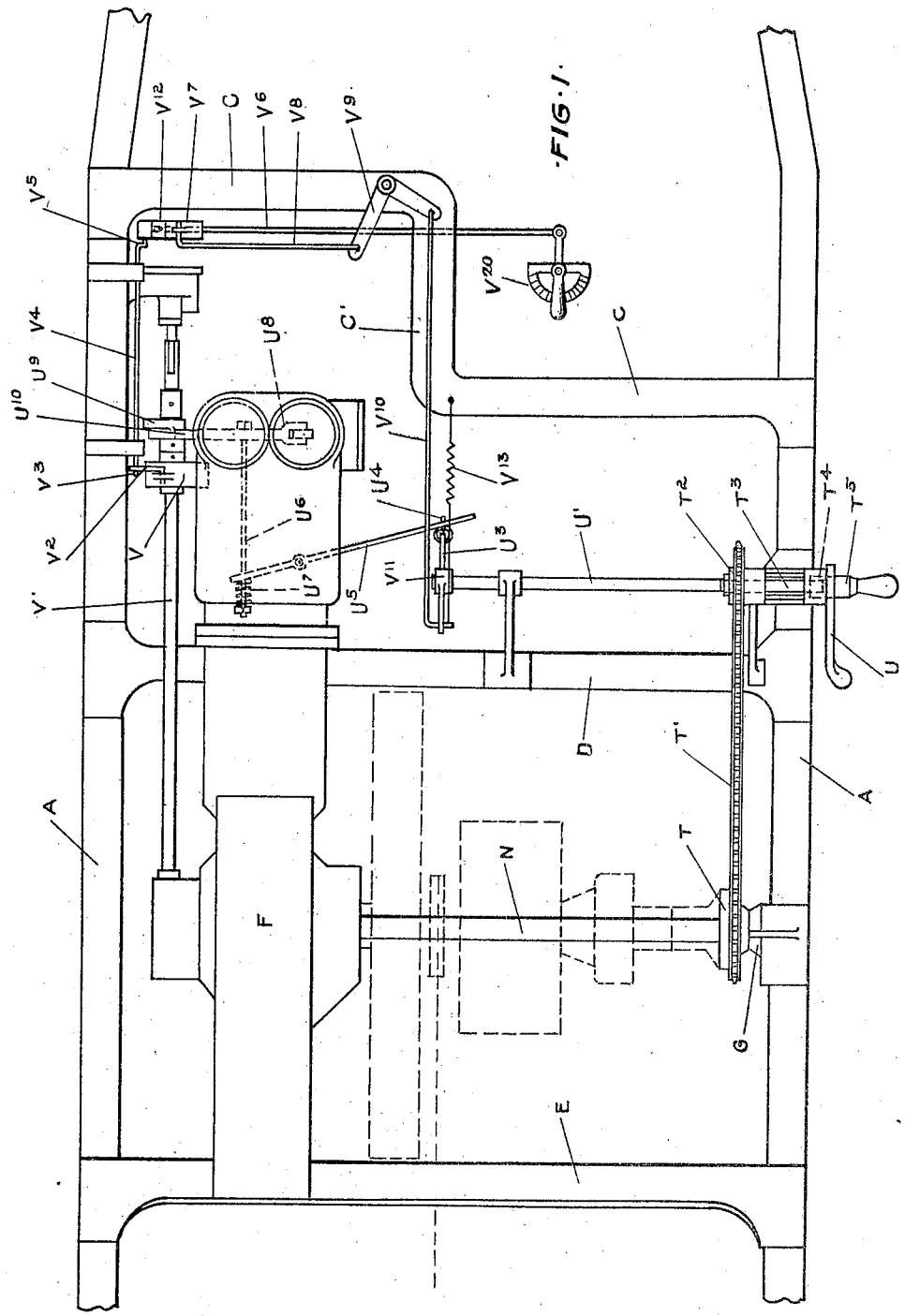
Figure 2:
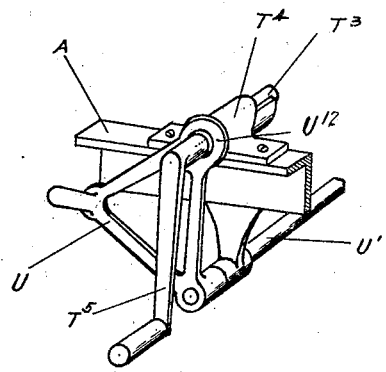
Figure 3:
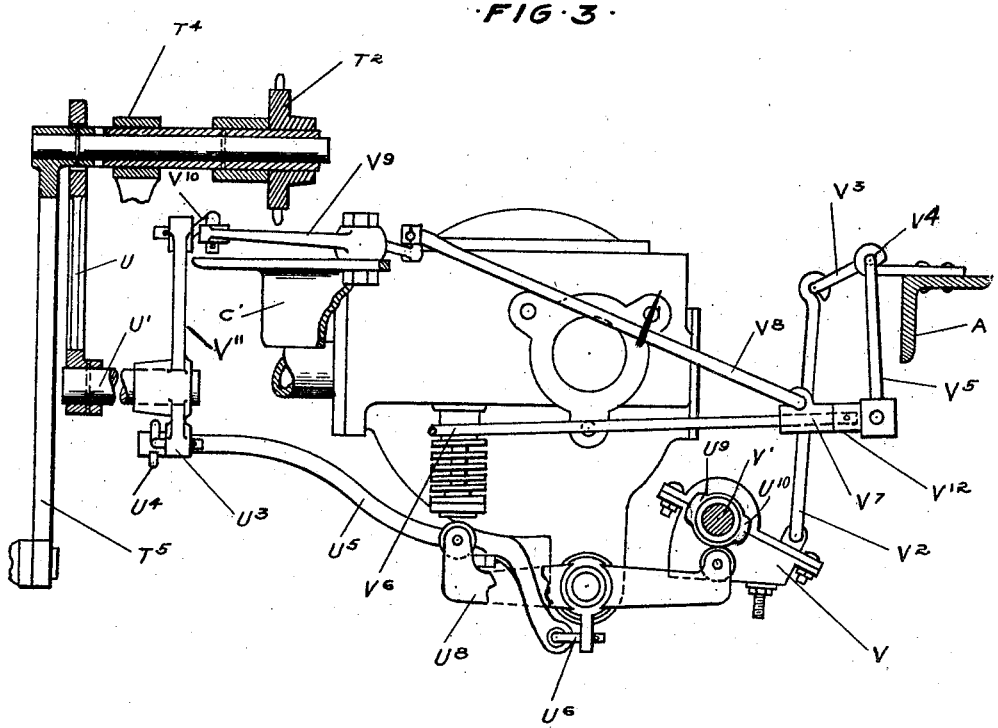
Figure 4:
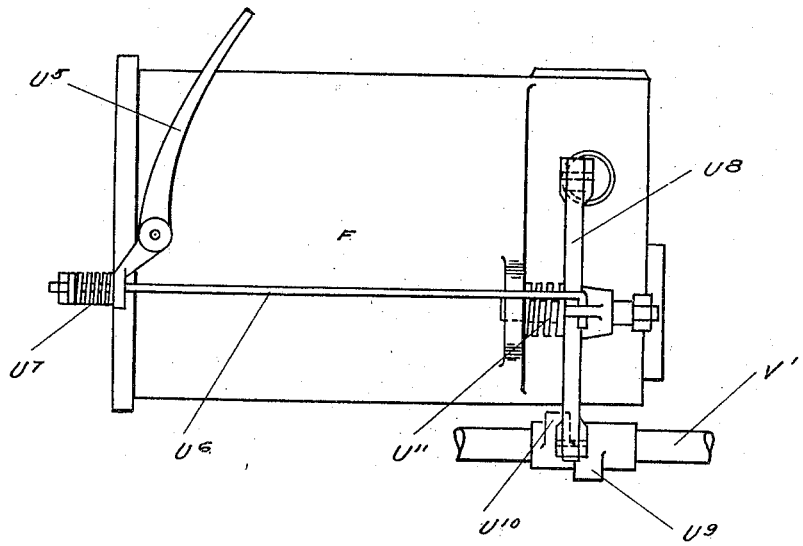
Figure 5:
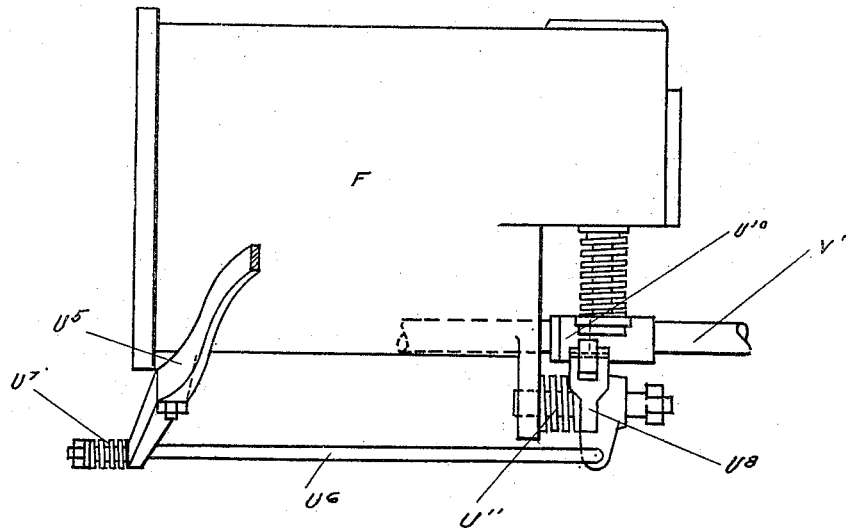

In the drawings, Figure 1 is a plan view; Fig. 2 is a perspective view of the starting mechanism; and Fig. 3 is an elevation partly in section of the starting mechanism and controlling devices. Fig. 4 is a bottom plan view; and Fig. 5 is a side elevation showing the exhaust valve shifting and operating mechanism.

The frame of the vehicle comprises the parallel side bars A and the cross bars C, D and E connecting the side bars at points intermediate their ends.

F is the engine frame which extends between the cross bars D and E and is rigidly secured thereto.

A starting mechanism is provided preferably comprising the sprocket wheel T having a ratchet engagement with the crank shaft N near the end thereof. This sprocket wheel is connected by the chain T' with the sprocket $T^2$ secured to a starting shaft $T^3$. The latter is preferably journaled in a bracket $T^4$ mounted upon the side bar A of the frame in proximity to the cross bar D thereof, and $T^5$ is a detachable starting crank which is adapted to engage with a socket formed in the outer end of the starting shaft $T^3$, the arrangement being such that when the crank is engaged with the shaft the latter may be rotated and through the sprocket and chain connection will impart an initial rotary movement to the crank shaft N.

It is usual in the construction of engines for motor vehicles to provide means for changing the timing of the sparker or igniter mechanism so that when the engine is in full operation an earlier explosion may be given. It is, however, necessary after the engine has stopped that the sparker should be readjusted before again starting the engine, as otherwise there would be danger of back firing and of seriously injuring the operator by the backward kick given to the starting crank. To avoid this difficulty I have provided means for compelling the retarding of the sparking, that is, the adjustment of the sparking mechanism so as to delay the time of explosion before the starting mechanism for the engine can be operated. In the construction shown, this is effected by providing the guard U which may be adjusted to cover the socket in the end of the starting shaft $T^3$ therewith. This guard U is preferably triangular in form with the guard proper at the angle U and with a circular opening at the angle $U^{12}$ for the passage of the starting crank and the triangle is connected at the third angle to a rock shaft U' journaled in bearings which are formed integral with the bracket $T^4$. The side of the guard between the angle U and the annular portion $U^{12}$ swings when rocked on the rock shaft U' through an arc which covers the socket in the end of the shaft $T^3$ and, consequently, access to said socket may be had only when the guard is in the position shown in Fig. 2, when the opening in the annular portion $U^{12}$ uncovers said socket. The rock shaft U' is connected by a system of rods and levers to the sparker or circuit closer V upon the valve shaft V' of the engine. The circuit closer has its adjustable member sleeved upon the shaft V' and is connected by a link $V^2$ to the rock arm $V^3$ on the rock shaft $V^4$. The opposite end of said rock shaft is provided with the rock arm $V^5$ which is connected by an actuating rod $V^8$ with the bell crank lever $V^9$ fulcrumed upon the cross bar C. The bell crank lever $V^9$ in turn is connected by a rod $V^{10}$ with a rock arm $V^{11}$ attached to the shaft U'. Thus the rocking of the shaft U' which occurs whenever the guard U is adjusted in position will transmit its movement through the connections described, to the circuit closer V and adjust the latter so as to change the time of ignition. Whenever the guard U is so adjusted as to uncover the socket in the shaft $T^3$ to permit of the engagement of the crank $T^5$, the circuit closer V will be adjusted to delay the ignition, so as to prevent all possibility of back firing.

In addition to the adjustment of the sparker, it is necessary before starting the engine to relieve the compression so that the operator may be enabled to revolve the starting crank. This is automatically accomplished by a second connection to the rock shaft $U'$ comprising the rock arm $U^3$ thereon connected by a link $U^4$ with a lever $U^5$ fulcrumed upon the engine casing. $U^6$ is a rod connected to the opposite end of the lever $U^5$ preferably through the medium of a spring $U^7$, and the opposite end of said rod is attached to the exhaust valve operating lever $U^8$, being adapted to shift said lever from its normal position where it co-operates with the exhaust cam $U^9$ on the shaft $V'$ to a position where it will engage with the relief cam $U^{10}$ upon said shaft as well as said exhaust cam $U^9$.

During the operation of the motor vehicle it is desirable to have the sparker under the control of the operator and it is usual to place the controlling mechanism therefor in a convenient position for operation, as for instance, in association with the steering mechanism. In the present construction I have shown a controlling device $V^{20}$ comprising a lever and sector which may be carried on the steering column. Said lever is secured to a rock shaft bearing a rock arm pivotally engaging the end of the rod $V^6$. As this is but one of the many forms of controlling devices well known to those skilled in the art, I have simply shown it in conventionalized form in Fig. 1. The operator may therefore adjust the sparker at any time through the medium of the rod $V^6$ instead of actuating it by adjusting the guard U. Such an operation will however shift the guard U so as to close the socket for the starting point whenever the sparker is adjusted for early ignition, but any further adjustment of the sparker through the medium of the rod $V^6$ may be accomplished without the movement of the guard by reason of the slip connection formed by the sleeve $V^7$ on the rod $V^6$ to which the rod $V^8$ is attached. This sleeve is adjacent to a fixed collar or stop $V^{12}$ on the rod $V^6$ against which it bears whenever the guard U is adjusted to uncover the socket. Thus the operator has perfect control of the sparking mechanism when the vehicle is running, and at the same time, as has been stated, the danger in starting the engine is avoided. By reason of the slip connection between the collar $V^7$ and $V^6$, the operator after starting the engine may immediately move the guard plate back so as to shift the exhaust valve lever again into engagement with the normal exhaust cam, and out of engagement with the relief cam, this being accomplished without shifting the sparker, by reason of the slip connection above mentioned. This shifting of the guard plate is preferably accomplished automatically by means of a spring $V^{13}$ as soon as the operator withdraws the starting crank from the socket. This spring $V^{13}$ is secured at one end to the cross bar C and at the other end to the rock arm $V''$ and thus acts to draw the rock arm $V''$ and rock the shaft $U'$, to which the guard plate is secured. The rocking of this shaft swings rock arm $U^3$ and retracts the lever $U^5$ through the link $U^4$. This releases the rod $U^6$ and thus permits the shifting of the exhaust valve lever by the spring $U'''$.

What I claim as my invention is,—

1. The combination with a motor, a starting mechanism adapted to receive a detachable crank, and an adjustable controlling device, of a guard for preventing the engagement of said crank with the said starting mechanism, a connection between said guard and said adjustable controlling device whereby the removal of said guard will adjust the controlling device suitably for the initial operation of the motor, and means whereby the guard is automatically returned when the crank is detached from the starting mechanism.

2. The combination with a motor, an adjustable controlling device, and starting mechanism adapted to receive a detachable crank, a guard for preventing the engagement of said crank with the starting mechanism, and connections between said guard and motor controlling device whereby the removal of said guard adjusts said controlling device suitably for the initial operation of the motor, and means whereby the guard is automatically returned independently of the controlling device when the said crank is detached from said starting mechanism.

3. The combination with a motor, an adjustable controlling device, a starting mechanism adapted to receive a detachable crank, and a compression relief, of a guard for preventing the engagement of said crank with the starting mechanism, connections between said guard and the motor controlling device, whereby the removal of the guard will adjust the controlling device and compression relief, suitably for the initial operation of the motor, and means automatically returning said guard and re-adjusting said compression relief when the crank is detached from the starting mechanism.

4. The combination with a motor, a starting mechanism adapted to receive a detachable crank, an adjustable controlling device, a compression relief, and a guard for preventing the engagement of said crank with the said starting mechanism, of connections between the guard, the controlling device, and the compression relief, whereby the removal of the guard adjusts the controlling device and the compression relief suitably for the initial operation of the motor, and means whereby the guard is automatically returned and the compression relief is automatically re-adjusted when the crank is detached, and the said connections being such that further adjustment of the controlling device is by the operator and is independent of the compression relief.

5. The combination with a motor, a starting mechanism adapted to receive a detachable crank, an adjustable controlling device, and a guard for preventing the engagement of said crank with the starting mechanism, of the rock shaft $V'$, the rock arm $V''$, the rod $V^{10}$, the spring $V^{13}$, the bell crank lever $V^9$, the actuating rod $V^8$, the rock arm $V^5$, the rock shaft $V^4$, the rock arm $V^3$ and the rod $V^2$, substantially as described.

6. The combination with a motor, a starting mechanism adapted to receive a detachable crank, an adjustable controlling device, a guard for preventing the engagement of said crank with said starting mechanism, and connections between said guard and said controlling device substantially as described, of a rock shaft $U'$, the rock arm $U^3$, the link $U^4$, the lever $U^5$, the rod $U^6$, the spring $U^7$, the exhaust valve operating lever $U^8$, and the relief cam $U^{10}$, substantially as described.

In testimony whereof I affix my signature in presence of two witnesses.

NORMAN T. HARRINGTON.

Witnesses:
JAS. P. BARRY,
H. C. SMITH.